Sept. 28, 1965 W. SCHLESSEL 3,208,404
SCOOP AND DISPENSER UTENSIL
Filed May 3, 1963 2 Sheets-Sheet 1
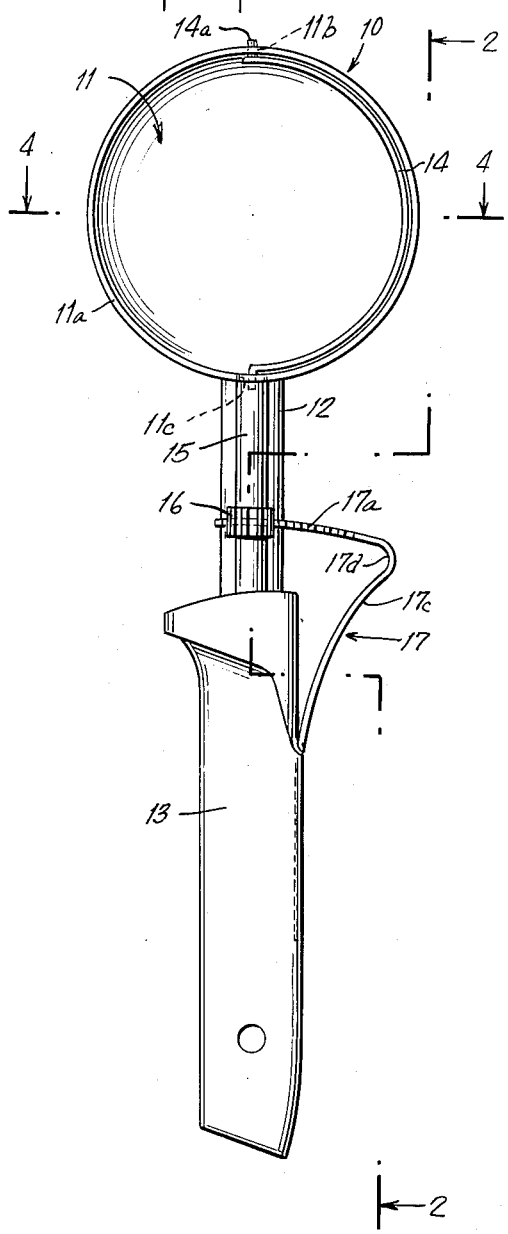
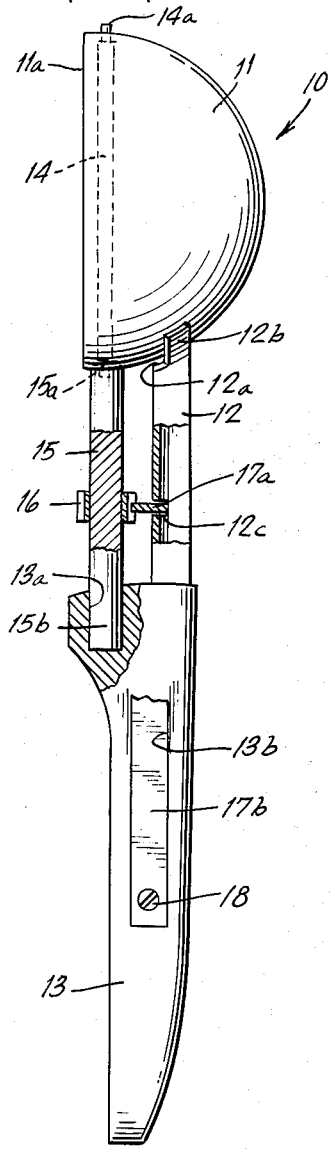
INVENTOR.
WALTER SCHLESSEL
BY
Barnett + Barnett
ATTORNEYS Sept. 28, 1965   W. SCHLESSEL   3,208,404
SCOOP AND DISPENSER UTENSIL
Filed May 3, 1963   2 Sheets-Sheet 2
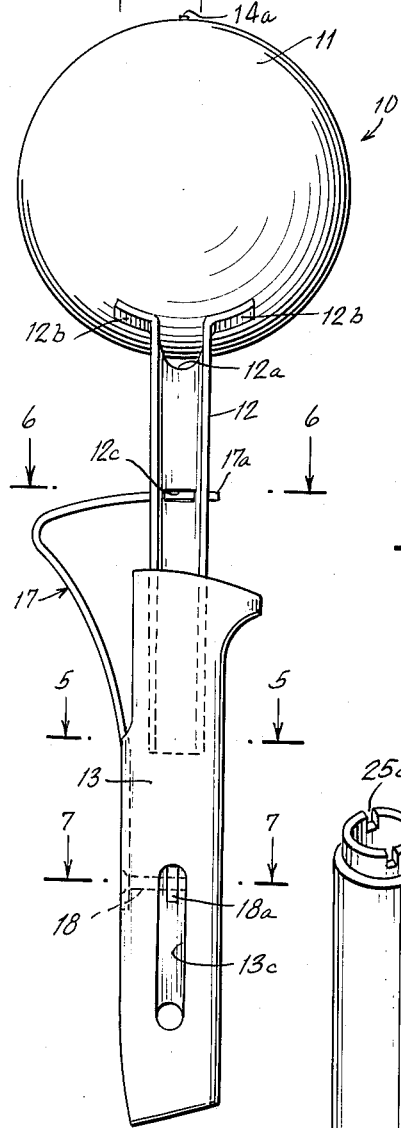
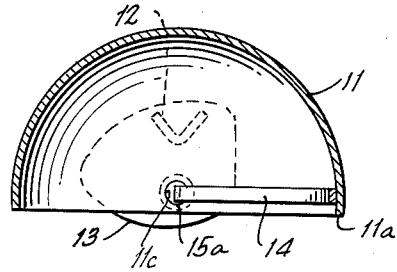
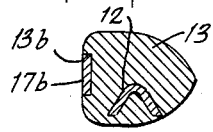
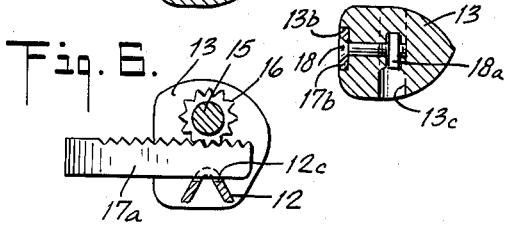
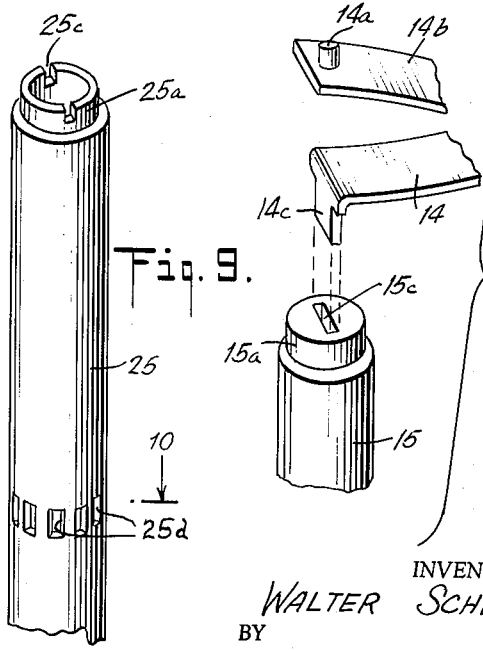
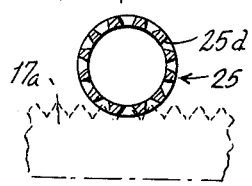
INVENTOR.
WALTER SCHLESSEL
BY
Barnett & Barnett
ATTORNEYS

United States Patent Office 3,208,404
Patented Sept. 28, 1965

3,208,404
SCOOP AND DISPENSER UTENSIL
Walter Schlessel, Lawrence, N.Y., assignor to Gessler Products Corporation, Jamaica, N.Y., a corporation of New York
Filed May 3, 1963, Ser. No. 277,844
4 Claims. (Cl. 107—48)

This invention relates to culinary utensils and more particularly is directed to a scoop and dispenser for dishing out ice cream, mashed potatoes and other semi-solid foods in measured quantities and in a hemispherical shape.

Among the objects of the invention is the general improvement of culinary utensils of the character described, which scoop and dispenser utensil shall comprise few and simple parts, which shall be relatively inexpensive to manufacture in quantity production requiring a minimum of labor to assemble, which shall incorporate a resilient leaf spring with a rack member as a unitary structure actuating a pinion for operating the bowls scraper, which shall be light weight, easy to keep clean and sanitary, attractive and modern in appearance, rugged in construction to withstand rough handling, foolproof in operation, and which shall be practical and efficient to a high degree in use.

Other objects of the invention will in part be obvious and in part hereinafter pointed out.

The invention accordingly consists of features of construction, combination of elements and arrangements of parts which will be exemplified in the constructions hereinafter disclosed, the scope of the application of which will be indicated in the claims following.

In the accompanying drawings in which various illustrative embodiments of the invention are shown:

FIG. 1 is a front elevational view of a scoop and dispenser utensil constructed to embody the invention.

FIG. 2 is a side view of the utensil with parts in section as taken along line 2—2 in FIG. 1 showing details of the scraper actuating means.

FIG. 3 is a rear elevational view of the utensil shown in FIGS. 1 and 2.

FIG. 4 is a sectional view taken along line 4—4 in FIG. 1 showing details of the scraper and bowl.

FIG. 5 is a sectional view taken along line 5—5 in FIG. 3.

FIG. 6 is a sectional view taken along line 6—6 in FIG. 3 showing details of the rack and pinion construction.

FIG. 7 is a sectional view taken along line 7—7 in FIG. 3 showing details of the attachment of the leaf spring lever to the handle.

FIG. 8 is an enlarged fragmentary exploded view of the scraper and actuating rod showing details of construction.

FIG. 9 is an enlarged perspective view of a modified form of actuating rod formed as a hollow tube with the pinion integrally formed therein as a ring of spaced cutouts, and FIG. 10 is a sectional view taken on line 10–10 in FIG. 9 with a portion of the rack shown in broken lines co-acting with the integral pinion.

Referring in detail to the drawings, 10 generally denotes a scoop and dispenser utensil seen in FIGS. 1, 2 and 3 to comprise a bowl 11 terminating one end of an elongated support 12, a handle 13 extending from the opposite end of support 12, a scraper 14 and an actuating mechanism for the scraper provided as an actuating rod 15 extending substantially parallel to support 12 and mounting a pinion 16 meshing with rack member 17a terminating a resilient leaf spring lever 17.

Elongated support 12 may be made of a suitable non-corrosive metal, such as stainless steel, formed as a channel member, V-shaped in cross-section, and oriented so that the apex of the channel faces the front of utensil 10. The upper end of support 12 is cut back in the apex region as at 12a to provide a bifurcation bent to form oppositely extending tabs 12b which conform to the outer surface of bowl 11 and are suitably joined thereto as by welding. The opposite end portion of support 12 may be attached to handle 13 as shown in FIG. 5 by being imbedded therein, where handle 13 is formed of a suitable molded plastic, or may be otherwise secured thereto by suitable fastening means.

Bowl 11 may be preferably made of a metal similar to that of support 12 and formed in approximately a hemispherical shape having rim 11a seen in FIG. 2 to be disposed substantially in a plane parallel to the longitudinal axis of support 12 and actuating rod 15. A pair of openings 11b and 11c are located adjacent rim 11a in axial alignment with actuating rod 15. Opening 11c is formed on the lower or support attachment side of bowl 11 and serves as a bearing in which the upper end 15a of actuating rod 15 is journaled, the opposite lower end 15b being journaled in a suitable bearing 13a formed in handle 13. Opening 11b, located on the upper side of bowl 11, may be relatively smaller than opening 11c and serves as a bearing for pivot pin 14a extending from the outer surface 14b adjacent one end of scraper 14. The opposite end 14c of scraper 14 is seen in FIG. 8 to be bent and cut back for insertion into a diametric slot 15c formed in the actuating rod upper end 15a.

Leaf spring lever 17 may also be made of a stainless steel but having resilient properties and is seen in FIGS. 1, 2, 3 and 5 to have a handle attachment end 17b positioned in a recess 13b formed in a side surface of handle 13 and suitably secured therein as by a screw 18 and nut 18a. A deep groove or depression 13c may be formed in a rear surface of handle 13 to permit insertion of nut 18a for engagement with screw 18 in the interior of handle 13. Rack member 17a is formed at the end of lever 17 opposite end 17b by providing suitable teeth along one edge thereof and is seen to extend substantially at right angles to handle attachment end 17b for meshing with pinion 16. A midportion 17c of lever 17 bows laterally away from handle 13 to locate bight 17d in a normally extended position for movement towards actuating rod 15 by finger pressure applied to midportion 17c. Rack member 17c extends between support 12 and actuating rod 15, the apex region of support 12 being formed with a slot 12c for guiding and retaining rack member 17c in meshing engagement with pinion 16 in all positions thereof.

Scraper 14 may also be made of a relatively resilient non-corrosive metal for bowing into a semicircular shape to conform to the interior surface of bowl 11.

The utility of the invention will now be apparent. After the parts are constructed as hereinbefore described and shown in the drawing with support 12 embedded in molded handle 13, the assembly of scoop and dispenser utensil 10 may be readily completed by first attaching leaf spring lever end 17b by means of screw 18 and nut 18a to seat in recess 13b with opposite ended rack member 17a extending through guiding slot 12c, inserting actuating rod lower end 15b into bearing 13a and spot welding bowl 11 to tabs 12b after positioning actuating rod upper end 15a in opening 11c and orienting slot 15c to extend along an axis from front to rear as shown in FIG. 4 and having pinion 16 meshing with rack member 17a with the latter in fully extended position. Scraper 14 may then be mounted by bowing to facilitate inserting bent end 14c into slot 15c and pivot pin 14a into upper opening 11b.

In operation, utensil 10 is grasped in the hand with the fingers extending around handle 13 and the thumb resting on midportion 17c of leaf spring lever 17. After the moldable food product, such as, ice cream, mashed potatoes or the like, is scooped up into bowl 11 in the well understood manner, the contents thereof is readily dispensed by inverting bowl 11 and applying thumb pressure to move leaf spring lever 17 toward support 12 thereby rotating actuating rod counterclockwise as seen in FIG. 4, and causing scraper 14 to scrape the interior surface of bowl 11 from right to left and dislodge the contents. Upon release of the thumb pressure, leaf spring lever 17 will return to its normal extended position seen in FIG. 1 thereby rotating actuating rod 15 clockwise to bring scraper 14 back to rest position. The open and simple arrangements of the parts facilitates cleaning of utensil 10 after use.

A modified form of actuating rod is shown in FIGS. 9 and 10 as rod 25 which is a hollow tube of larger cross-sectional area than that of rod 15 and is provided with a series of spaced cutouts or slots 25d located, sized and shaped to mesh with the teeth of rack member 17a. Rod 25 may also have an upper end 25a of reduced diameter to journal in bowl lower opening 11c and transverse slots 25c to receive bent end 14c of scraper 14 in a manner similar to upper end 15a and slot 15c, respectively, of actuating rod 15.

It is thus seen that there is provided an improved scoop and dispenser utensil in which the several objects of the invention are achieved and which are well adapted to meet conditions of practical use.

As various possible embodiments might be made in the above invention, and as various changes might be made in the constructions above set forth, it is to be understood that all the matters herein set forth or shown in the accompanying drawings are to be interpreted as illustrative and not in a limiting sense.

Having thus described my invention, I claim as new and desire to secure by Letters Patent:

1. In a scoop and dispenser utensil of the character described including a handle, a support extending from the handle and terminating in a bowl, a scraper mounted to sweep the interior surface of the bowl, and means for actuating the scraper comprising a rod spaced from said support and journaled for rotation at opposite ends thereof in said handle and bowl with the journaled bowl end engaging the scraper, a leaf spring lever having longitudinal side edges and being anchored at one end in said handle and having an opposite free end extending at right angles to the rod, said leaf spring lever free end being integrally formed along one of said longitudinal side edges as a rack having teeth engaging companion elements carried by the rod, said leaf spring lever being flexible upon pressure from a normal rest position to rotate said rod and scraper for dislodging contents from the bowl, said support having a transverse slot facing said rod and positioned in alignment with said companion elements, the slot receiving said rack for reciprocation therein for guiding and retaining the rack in engagement with said rod companion elements.

2. In the scoop and dispenser utensil defined in claim 1, said leaf spring lever anchored end extending parallel to the axis of the handle, a midportion of said leaf spring lever bowing laterally away from the handle providing a thumb rest for exerting said pressure.

3. In the scoop and dispenser utensil defined in claim 1, said rod companion elements being in the form of pinion teeth meshing with said rack teeth.

4. In the scoop and dispenser utensil defined in claim 1, said rod being formed as a hollow tube, and said companion elements being a series of spaced slots in the wall of the tube located, sized and shaped to mesh with said rack teeth.

References Cited by the Examiner

UNITED STATES PATENTS

| | | | |
|---|---|---|---|
| D. 196,527 | 10/63 | Schessel | 107—48 |
| 901,437 | 10/08 | Graffort et al. | 107—48 |
| 903,563 | 11/08 | Graffort et al. | 107—48 |
| 1,826,818 | 10/61 | Palmer | 107—48 |

ROBERT E. PULFREY, *Primary Examiner.*

CHARLES A. WILLMUTH, *Examiner.*